United States Patent
Christen et al.

(10) Patent No.: US 12,065,044 B2
(45) Date of Patent: Aug. 20, 2024

(54) METHOD OF CONTROLLING ELECTRIC LOAD SHEDDING IN A VEHICLE

(71) Applicant: Ford Global Technologies, LLC, Dearborn, MI (US)

(72) Inventors: Urs Christen, Aachen (DE); David Ramiro, Richmond (GB); Handian Chen, Aachen (DE); Fazal U. Syed, Canton, MI (US); Sassan Farahmand, Canton, MI (US); Brendan Jenkins, Canton, MI (US); Douglas Michael Smith, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 17/657,303

(22) Filed: Mar. 30, 2022

(65) Prior Publication Data

US 2022/0332196 A1 Oct. 20, 2022

(30) Foreign Application Priority Data

Apr. 16, 2021 (EP) .................................. 21168882

(51) Int. Cl.
| | |
|---|---|
| *B60L 50/11* | (2019.01) |
| *B60L 1/00* | (2006.01) |
| *B60L 50/16* | (2019.01) |
| *B60L 50/61* | (2019.01) |
| *B60M 3/02* | (2006.01) |

(Continued)

(52) U.S. Cl.
CPC ................. *B60L 50/11* (2019.02); *B60L 1/00* (2013.01); *B60L 1/003* (2013.01); *B60L 50/16* (2019.02); *B60L 50/61* (2019.02); *B60M 3/02* (2013.01); *B60W 10/08* (2013.01); *H02J 1/14* (2013.01)

(58) Field of Classification Search
CPC .......... B60L 50/11; B60L 50/16; B60L 50/61; B60L 1/00; B60L 1/003; B60M 3/02; B60W 10/80; H02J 1/14
See application file for complete search history.

(56) References Cited

U.S. PATENT DOCUMENTS

| | | | |
|---|---|---|---|
| 6,624,529 B2 | 9/2003 | Obayashi | |
| 7,173,347 B2 | 2/2007 | Tani et al. | |
| 7,443,048 B2 | 10/2008 | Bernardi et al. | |

(Continued)

*Primary Examiner* — Tulsidas C Patel
*Assistant Examiner* — Thomas K Quigley
(74) *Attorney, Agent, or Firm* — David Kelley; McCoy Russell LLP

(57) ABSTRACT

Methods and systems are provided for electrical power distribution. In one example, a system includes plurality of electric consumers comprising one or more operating modes with different levels of power consumption, an energy storage and an electric machine arranged in the vehicle and configured to provide energy to the energy storage device or power to the electric consumers and torque to wheels of the vehicle, a power allocating device coupled to the energy storage device and the plurality of electric consumers, and a controller configured to maintain two indices for allocating power to the plurality of electric consumers, wherein a first index comprises a first power allocation strategy based on power from only the energy storage device and a second index comprises a second power allocation strategy based on power from the energy storage device and the electric machine.

20 Claims, 3 Drawing Sheets

(51) Int. Cl.
*B60W 10/08* (2006.01)
*H02J 1/14* (2006.01)

(56) References Cited

U.S. PATENT DOCUMENTS

| | | | |
|---|---|---|---|
| 10,015,927 B2 | 7/2018 | Fritz et al. | |
| 10,322,712 B2* | 6/2019 | Miller | B60W 10/08 |
| 2006/0022469 A1* | 2/2006 | Syed | B60K 6/44 |
| | | | 290/40 C |
| 2015/0231982 A1* | 8/2015 | Li | B60L 3/0069 |
| | | | 903/907 |
| 2015/0231986 A1* | 8/2015 | Li | B60L 58/13 |
| | | | 903/903 |
| 2015/0232083 A1* | 8/2015 | Yu | B60W 10/06 |
| | | | 701/53 |

* cited by examiner

METHOD OF CONTROLLING ELECTRIC LOAD SHEDDING IN A VEHICLE

CROSS REFERENCE TO RELATED APPLICATION

The present application claims priority to European Patent Application No. 21168882.5 filed on Apr. 16, 2021. The entire contents of the above-listed application is hereby incorporated by reference for all purposes.

FIELD

The present description relates generally to a method of controlling electric load shedding in a vehicle. The disclosure further relates to a vehicle having means adapted to execute the steps of the method. The disclosure also relates to a computer program comprising instructions to cause the vehicle to execute the steps of the method and a computer-readable medium having stored thereon the computer program.

BACKGROUND/SUMMARY

A vehicle may comprise a number of on-board electricity consuming devices, each having a power demand in the case of its operation. The power demand may be considered to be a maximum physical electric power demand. Vehicles may comprise an electric power supply system for supplying electric power to all of these on-board electricity consuming devices. The electric power supply system may be designed to fulfill the total physical electric power demand of all these electricity consuming devices under normal conditions. However, there may be operating conditions leading to scenarios under which the electric power supply system is not capable of providing the total physical electric power demand, such as during a cold-start when a battery is cold. Ignoring these scenarios may lead to unanticipated voltage drop or voltage cut off in the electric power supply system. Thereby, undesired operation of some electricity consuming devices or at least a loss of desired functionality may occur, affecting customer satisfaction and/or driving conditions.

To overcome these problems, load shedding may be performed to reduce the total physical electric power consumption of the electricity consuming devices by not continuing to supply electric power to all of the electricity consuming devices or by metering the power consumption of one or more of the electricity consuming devices. This is called load shedding with respect to the electricity consuming devices being shut off or affected by a reduction of power consumption. It is desirable that such load shedding firstly affects electricity consuming devices which will not or only to a least degree affect comfort and security aspects during use of the vehicle. Therefore, priority schemes can be implemented with information about priorities relating the electricity consuming devices, allowing for first shedding the least prioritized electricity consuming devices, i.e. the devices with the lowest priorities among all electricity consuming devices.

However, previous load shedding methods have some disadvantages since not all electricity consuming devices may persistently consume their nominal electric power demand. For example, a modern inverter-driven climate compressor may include a varying power demand for a number of operation modes according to varying cooling power being demanded.

Furthermore, some other electricity consuming devices might have gradations of functionality. Some of these gradations of functionality, for example even a minimum functionality, might be relevant for security and comfort purposes but less electric power consuming compared to higher functionality, whereas such higher functionality may be much more power consuming but less relevant for security and comfort purposes than the minimum functionality.

This may lead to undesired working conditions of the vehicle due to physically undesired shedding of some devices due to unnecessarily taking into account power demands of some devices in a conservative way.

It is an aim of the disclosure to improve the distribution of electric energy or power for supplying the on-board electricity consuming devices of a vehicle.

The method of controlling electric load shedding in a vehicle is dedicated to a vehicle comprising a plurality of electricity consuming devices. These may be on-board devices forming an integral part of the vehicle.

In one example, the issues described above are at least partially solved by a system including a plurality of electric consumers comprising one or more operating modes with different levels of power consumption, an energy storage device arranged in a vehicle, an electric machine arranged in the vehicle and configured to provide energy to the energy storage device or power to the power consuming devices and torque to wheels of the vehicle, a power allocating device coupled to the energy storage device and the plurality of electric consumers, and a controller comprising computer-readable instructions stored on memory thereof that when executed enable the controller to maintain two indices for allocating power to the plurality of electric consumers, wherein a first index comprises a first power allocation strategy based on power from only the energy storage device and a second index comprises a second power allocation strategy based on power from the energy storage device and the electric machine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
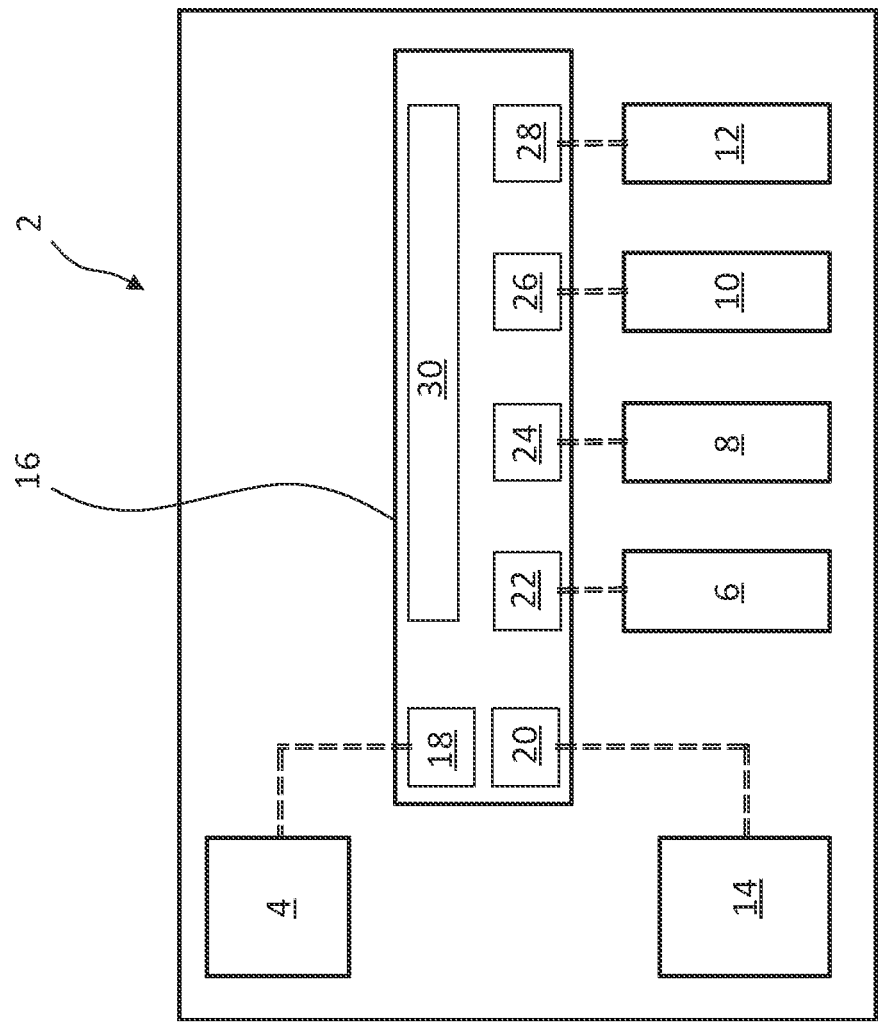
FIG. 1 illustrates a schematic illustration of a vehicle.
Figure 2:
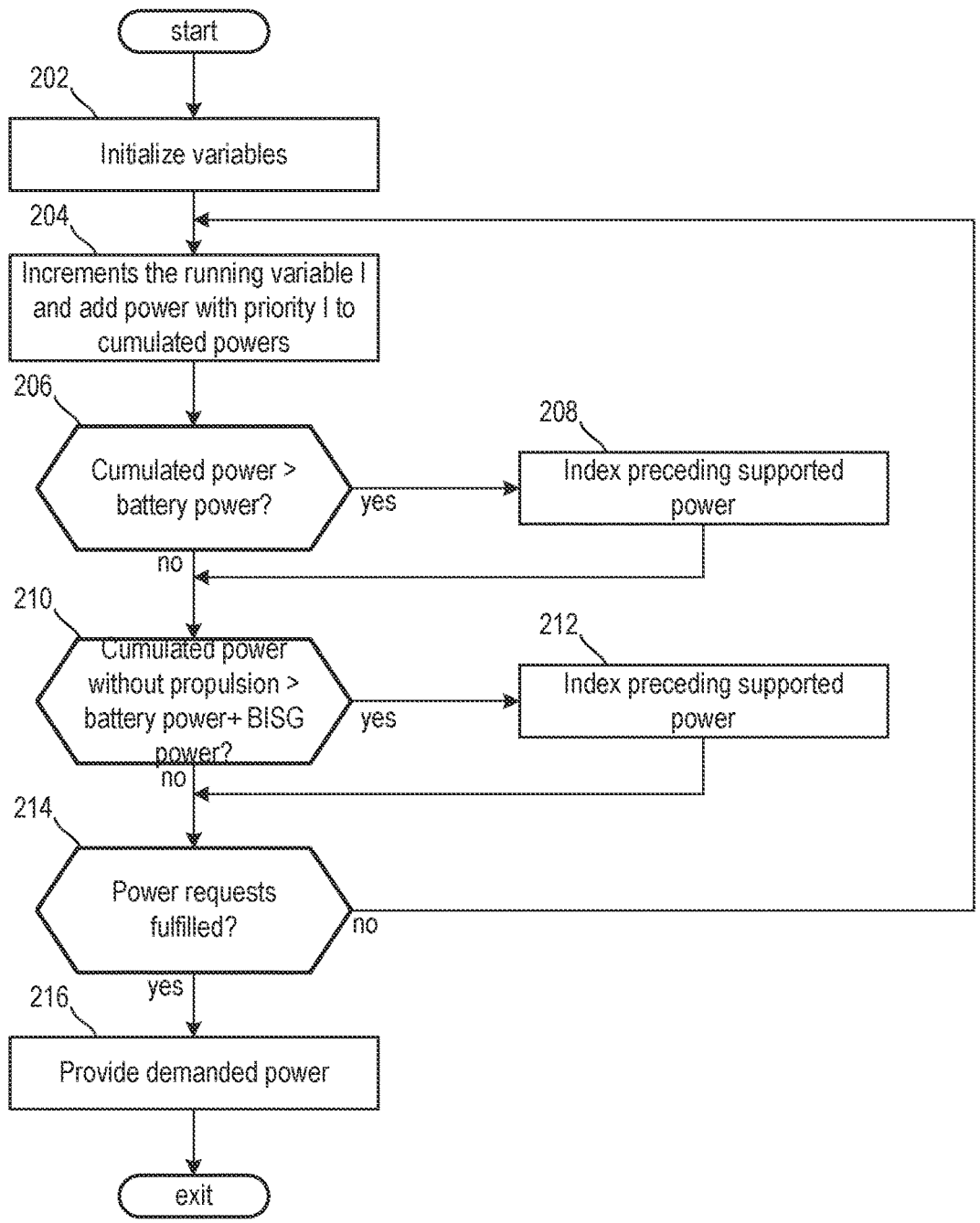
FIG. 2 illustrates a method for allocating electrical power to electric consumption devices of the vehicle.
Figure 3:
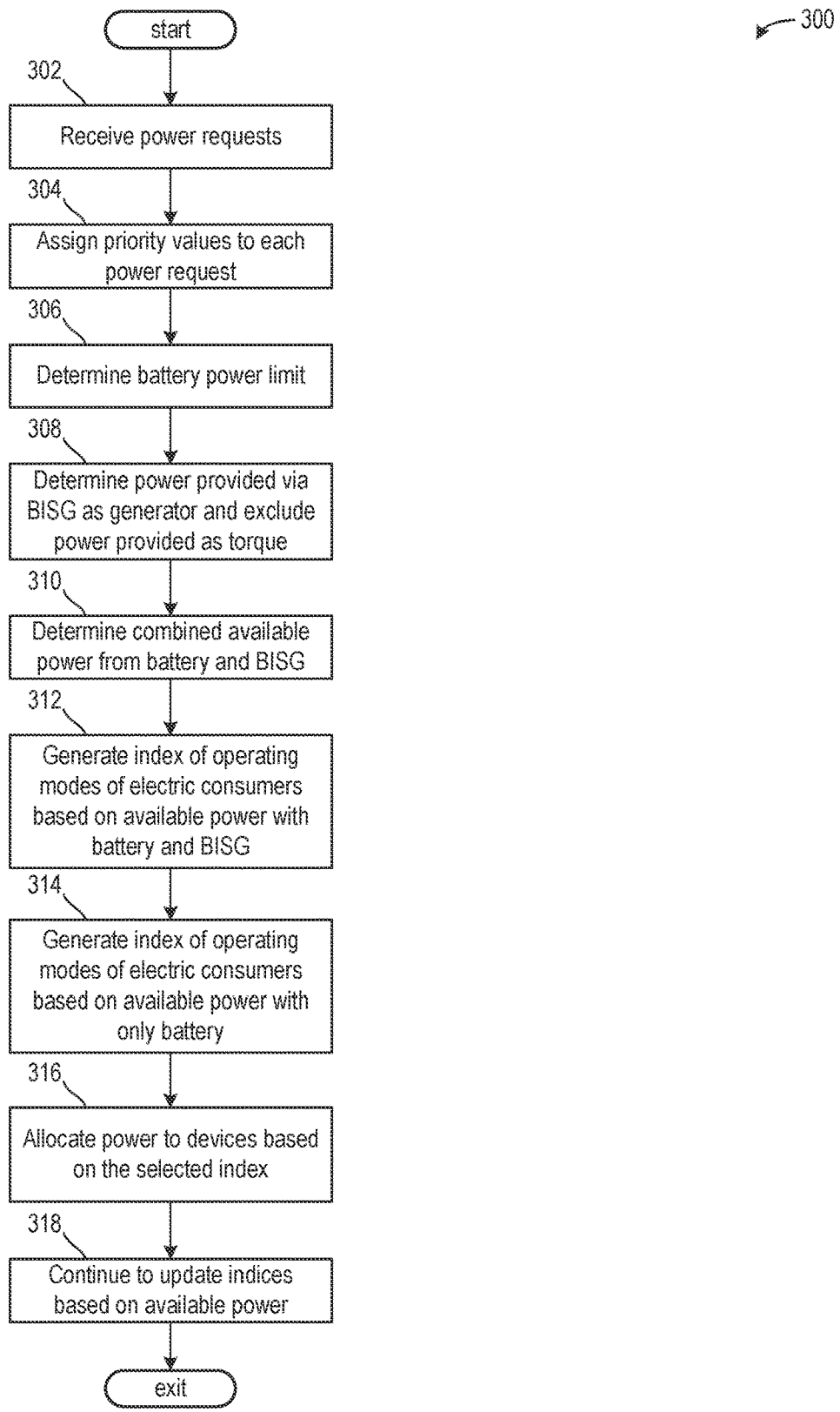
FIG. 3 illustrates a method for updating indices for strategizing power allocation to a plurality of consumers.

The following description relates to systems and methods for adjusting electric power distribution in a vehicle. An example schematic of a vehicle is shown in FIG. 1. A method for allocating electrical power to electric consumption devices of the vehicle is shown in FIG. 2. FIG. 3 illustrates a method for updating indices for strategizing power allocation to a plurality of consumers.

The vehicle may for example be a commercial vehicle, a car, in particular a passenger car, or another land craft. The method according to the disclosure can be applied to all types of vehicles, as long as such type of vehicle comprises one or more electricity consuming devices. The method according to the disclosure can be applied to vehicles with all kinds of propulsion, e.g. the vehicle being propelled by an internal combustion engine, an electric motor, or a combination thereof.

Each one of the electricity consuming devices includes one or more possible operation modes it can be operated in. In this sense, each electricity consuming device is operable in one full functionality mode. In cases of an electricity consuming device including only one possible operation mode, it is considered to be a full functionality mode. In cases of an electricity consuming device including more than one possible operation mode, these further operation modes are considered to be reduced functionality modes having a reduced range of functionality with respect to the full functionality mode.

Each one of the electricity consuming devices (herein, interchangeably referred to as an electric consumer and/or consumer) may demand to be supplied with electricity. Each one of the possible operation modes of each one of the electricity consuming devices has an individual physical electric power demand. The physical electric power demand is the factually consumed electric power of a device in the category of electrical energy per time. According to the operation modes potentially changing with time during operation of the vehicle, the individual physical electric power demand of each device may considerably fluctuate over time according to its presently operated functionality mode. In its full functionality mode, each of the electricity consuming device has its highest physical electric power demand. In one or more reduced functionality modes, the corresponding physical electric power demand is also reduced. A functionality mode with the least physical electric power demand of an electricity consuming device is considered to be a minimum functionality mode of said electricity consuming device. Being operated in its minimum functionality mode, the electricity consuming device only provides a basic functionality being of some importance.

In the case that one or more electricity consuming devices have a plurality of possible operation modes, these electricity consuming devices may include a corresponding set of functionality modes, each one of these functionality modes being associated with one respective physical electric power demand.

For example, in the case that an air-conditioning device with an electrically powered climate compressor is one of the electricity consuming devices, the entire air-conditioning device may have a possible operation mode being a full functionality mode being able to providing the highest cooling power to the passenger cabin, thereby having the highest physical electric power demand for driving its climate compressor under these conditions. In another possible operation mode being a first reduced functionality mode of such an exemplary air-conditioning device, only the electronic control means of the air-conditioning device and venting of the passenger cabin by relatively small fan motors may be carried out. In this first reduced functionality mode, the air-conditioning device has a reduced physical electric power demand by not driving the electric climate compressor. Also a second reduced functionality mode being a minimum functionality mode at the same time may be possible, e.g. by only operating the electronic control means of the air-conditioning device and some of its sensors for observing the passenger cabin ambient conditions.

The sum of all physical electric power demands leads to a total physical electric power demand of all the electricity consuming devices. The total physical electric power demand can be fluctuating over time.

The vehicle comprises an electric power supply system. The electric power supply system comprises at least a battery. The electric power supply system is able to provide a physical total available electric power. Under normal circumstances and operation conditions of the vehicle, the physical total available electric power is usually dimensioned so as to supply the total physical electric power demand. Thus, an undesired voltage drop may not occur in the electric power supply system even if the operation modes of each one of the electricity consuming devices are their respective full functionality modes.

A vehicle including a controller with instructions stored on memory thereof that enable the controller to execute the method according to the disclosure also has a power allocating device. The power allocation device is arranged to operate the physical allocation of electric power from the electric power supply system to the electricity consuming devices. The physical allocation may comprise operations being carried out by the power allocation device by providing closing operations for electric circuits and/or opening operations for electric circuits and/or power-regulating operations for electric circuits. This can be realized for example by switching elements, e.g. semiconductor switches, electromechanical relays, or other. Furthermore, via controllers that can regulate the power consumption, each one of the electricity consuming devices can be supplied with an individual device amount of allocated electric power from the electric power supply system. In some cases, the electricity consuming devices may not have the ability of being power-regulated and can only be switched off to restrict their consumption. The power allocating device may be a single integrated switching or controlling device, e.g. in the sense of a single printed circuit board, but alternatively may also be implemented as a distributed infrastructure in the vehicle. The implementation can be realized for example in such a way that switching elements and/or controllers, e.g. semiconductor switches, electromechanical relays or other electrically live part contributing to the distribution of individual device amount of allocated electric power from the electric power supply system to the electricity consuming devices form part of the respective electricity consuming devices. E.g., each one of the electricity consuming devices may have its own controller that can regulate its physical electric power consumption. In this case, the power allocating device can also comprise a central control unit which determines the grantable allocation of physical electrical power of each electricity consuming device. Accordingly, the central control unit operates the distributed controllers of the power allocating device to physically put the physical electric power consumption of the electricity consuming devices into effect.

The method of controlling electric load shedding may comprise a number of method steps for obtaining a very reliable operation of the electricity consuming devices.

The method comprises a method step of determining a total available electric power value. The total available electric power value represents the physical total available electric power in the sense of the method.

The determination of the total available electric power value can be executed e.g. by measuring and evaluation devices of the vehicle being associated with and/or being part of the electric power supply system, e.g. voltage measuring devices, current measuring devices, and evaluation devices for determining the total available electric power value from the measured data. Alternatively, the total available electric power value can be obtained by evaluating empirical values of total available electric power values or information related thereto. In each case, the determined total available electric power value thus retains the information of the physical total available electric power.

The method also comprises a method step of determining an electric power request scheme. The electric power request scheme is a data set comprising a plurality of electric power request values and/or electric power request increment values. The electric power request values and/or electric power request increment values represent the actual physical electric power demands of the possible operation modes of the electricity consuming devices in the sense of this method. The data set retains the information about the actual physical electric power demands of the possible operation modes of the electricity consuming devices. As a first example to implement this, each electric power request value represents the actual physical electric power demand according to one possible operation mode of one electricity consuming device. As a second example, each electric power request increment value represents a difference in physical electric power demand with respect to another possible operation mode of the same electricity consuming device.

Also a combination of electric power request values and/or electric power request increment values and/or other appropriate values can constitute the data set being the power request scheme, as long as the information about the set of actual physical electric power demands of the possible operation modes of the electricity consuming devices is retained in said data set.

The determination of the actual electric power request values and/or electric power request increment values of the possible operation modes can be executed e.g. by measuring and evaluation devices of the vehicle being preferably associated with and/or being part of the electricity consuming devices or the power supply system, e.g. voltage measuring devices, current measuring devices, and evaluation devices for determining electric power request values and/or electric power request increment values from measured data. Alternatively, the electric power request values and/or electric power request increment values can be determined from empirical data about electric power request values or information related thereto. One possibility is that each electricity consuming device provides an information about its actual physical electric power demand in the form of an electric power request value and/or electric power request increment value, e.g. as a data signal. In each case, the determined set of electric power request values and/or electric power request increment values thus retains the information of the physical electric power demand relating to each of the possible operation modes of the electricity consuming devices.

The method further comprises a method step of evaluating an operation mode priority scheme. The operation mode priority scheme is a data set of a plurality of operation mode priority values, wherein each operation mode priority value corresponds to one of the possible operation modes of the electricity consuming devices. In general, the operation mode priority values can be chosen freely so as to assign one priority to each of the operation modes of the electricity consuming devices. Thus, all possible operation modes of the electricity consuming devices can be sorted according to their respective operation mode priority values. In the sense of this application, lower operation mode priority values indicate higher priorities. For example, a priority value of 1 indicates a higher priority than a priority value of 2. Those skilled in the art can translate such a scheme without loss of generality, e.g. into a scheme in which higher priorities are indicated with higher values.

The operation mode priority values allow for determining a ranking order of all possible operation modes of the electricity consuming devices. Thus, the method according to the disclosure allows for considering the individual degree of importance of each possible operating mode in a sophisticated way.

The method comprises a further method step of determining an allocation priority value on the basis of the determined data. The allocation priority value is that certain one operation mode priority value which divides the possible operation modes of the electricity consuming devices in a first set of those which can fully be supplied by the electric power supply system and a second set which cannot.

For this reason, the allocation priority value is determined as being the one representing the lowest priority among the operation mode priority values which does meet the demand that the total available electric power value is equal or higher by an excess available power value than the sum of the maximum power request values of each of the electricity consuming devices being referred to by one of the operation mode priority values which are representing equal or higher priority than the allocation priority value. For example, a lower operation mode priority value is considered to represent a higher priority, the allocation priority value is determined as being the highest among the operation mode priority values which does meet said demand.

Thus, each electricity consuming device meeting the condition of referring to at least one operation mode priority value of one of its possible operation modes being equal or lower than the allocation priority value can be electrically supplied by the electric power supply system. The amount of electric power which can be allocated to each of these electricity consuming devices refers to the maximum of an eventual plurality of operation modes meeting said condition.

A variant of determining the allocation priority value is possible if the data set of the electric power request scheme comprises only electric power request increment values in such a structure that for each electricity consuming device each certain electric power request increment value represents the difference in electric power being additionally demanded with respect to the possible operation mode of that electricity consuming device with the next lower priority value, i.e., the next higher priority. In this case the maximum power request value of each electricity consuming device can be determined by simply adding up all electric power request increment values of said electricity consuming device for which operation priority values are smaller or equal to the allocation priority value.

The method comprises a further method step of operating the physical allocation of electric power from the electric power supply system to the electricity consuming devices via the power allocating device. The power allocating device is then operated in such a way that a device amount of allocated electric power from the electric power supply system is physically allocated respectively to each of the electricity consuming devices being referred to by operation mode priority values which are representing equal or higher priority than the allocation priority value. This can be performed by a computer program which causes that the allocation of the supported power levels is executed based on an association of said power levels with their corresponding electricity consuming device. Each device amount of allocated electric power corresponds to the maximum power request value of each of the electricity consuming devices being referred to by one of the operation mode priority values which are representing equal or higher priority than the allocation priority value.

All other electricity consuming devices get zero power allocated and are not allowed to draw any power.

In a further embodiment of the disclosure, the electric power supply system of the vehicle comprises an electric machine, such as a belt-driven integrated starter generator, wherein the electric machine is operable in a first operation variant as an electric vehicle propulsion motor being one of the electricity consuming devices and wherein the electric machine is operable in a second operation variant as a generator being part of the electric power supply system. Thus, the method may apply effectively to both variants, leading to efficient electricity management.

In a further embodiment of the disclosure, the method comprises the method step of determining a first electric power request scheme, its data set comprising a power request value and/or power request increment value retaining the information about the physical electric power demand of the electric machine in its first operation variant.

Additionally, the method comprises the step of determining a first total available electric power value retaining the information of the physical total available electric power of the electric power supply system neglecting eventual power contributions of the electric machine in its second operation variant.

In this way, the load shedding may be optimized for taking into account the cases when the electric machine is used as a propulsion motor. Thus, the allocation of electricity is optimized for such conditions.

In a further embodiment of the disclosure, the method comprises the method step of determining a second electric power request scheme, its data set comprising a power request value and/or power request increment value retaining the information about the physical electric power demand of the electric machine in its second operation variant. It is to be noted that when the electric machine is operated as a generator, there is no demand. The value may be 0 W.

Additionally, the method comprises the step of determining a second total available electric power value retaining the information of the physical total available electric power of the electric power supply system including an electrical power contribution from the electric machine in its second operation variant.

By doing this, the load shedding is exceptionally optimized for taking into account the cases when the electric machine is used as an electric generator. Thus, the allocation of electricity is optimized for such conditions. For example, this strategy provides flexibility to potentially treat propulsion with greater level of priority than the support of other electrical consumers.

In a further embodiment of the disclosure, the method comprises the method step of identifying cases when the electric machine is operated in its second operation variant. If such a case is met, then the physical allocation of electric power from the electric power supply system to the electricity consuming devices is operated via the power allocating device in such a way that in the case of an excess available power value being identified, a partial device amount of allocated electric power is physically allocated from the electric power supply system to the electricity consuming devices to which the next higher priority value with respect to the allocation priority value refers.

By doing this, partial allocation of electrical power is performed in cases when the electric machine is operated in its second operation variant as a generator. If the electric machine instead is operated in its first operation variant for propulsion, no partial allocation is performed. This leads to more flexibility for using the electric machine for dynamic propulsion, e.g. for enhanced usage of instantaneously demanded additional propulsion power.

According to a further embodiment of the disclosure, the vehicle is a Hybrid Electrical Vehicle, in particular a mild Hybrid Electrical Vehicle, wherein the electric power supply system is a 48 V power supply system, its battery being a 48 V battery.

In such a Hybrid Electrical Vehicle the benefits of the method according to the disclosure are eminently brought to bear with respect to the pervasive dynamic demand for additional propulsion power In a further embodiment of the disclosure, the plurality of electricity consuming devices comprise one or a plurality of the following on-board devices, such as, a battery charging device, a DC/DC converter to power the 12 V net of the vehicle, an electrically heated catalyst, an electrically driven compressor, and a 230 V or 110 V power socket. Each of these electricity consuming devices can, in some configurations, provide at least two possible operation modes. For example, the battery charging device may include a full functionality mode being arranged in such a way as to provide quickest possible charging of the battery, as well as a minimum functionality mode being arranged in such a way as to ensure at least a minimum voltage of the battery to avoid battery degradation. Concerning the DC/DC converter, this electricity consuming device can for example have a full functionality mode for normal operation of the entire 12 V net and a minimum functionality mode e.g. for powering only the control units of the vehicle while comfort features (seat heating, etc.) would have to be shed. The other electricity consuming devices might have a full functionality and a minimum functionality as well.

Usually a minimum functionality mode with only the higher priority basic functions of an electricity consuming device is associated with a lower operation mode priority value than a full functionality mode.

In a further embodiment of the method according disclosure, one of the method steps or a plurality of the method steps or all of the method steps are performed repeatedly, e.g. in one or more loops being sequentially repeated. In one example, the steps may be executed during a wide range of operating parameters.

A dynamic adaption of the method with respect to different driving conditions of the vehicle may be executed. For example, fast and periodically recurring events of actualizing the determinable data as discussed above allows for a fast response to changing boundary conditions which potentially can affect the performance of the vehicle and/or customer satisfaction.

The vehicle according to any embodiment of the disclosure is adapted to execute the steps of the method according to the embodiment of the disclosure. The means for executing the steps of the method according to any embodiment of the disclosure can be for example controlling devices, e.g. being or comprising microcontrollers, driving stages and/or power stages for executing the steps interacting with other physical devices of the vehicle, such as for example the power allocating device.

In a further embodiment of the instructions stored on memory of the controller according to the disclosure, the instructions include a program routine for performing the method step of evaluating the operation mode priority scheme, wherein the operation mode priority scheme is treated in the form of an operation mode priority vector having the plurality of operation mode priority values as its entries.

Furthermore, the instructions include a program routine for performing the method step of evaluating the electric power request scheme, wherein the electric power request scheme is treated in the form of an electric power request vector having the plurality of power request values and/or power request increment values as its entries.

This allows for structured programming of the method, e.g. the operation mode priority scheme.

In a further embodiment of the method according to the disclosure, the electric power request vector in one or more routines contains the power request increment values as its entries, for example in such a structure that each of its entries respectively refers to one possible operation mode and to one operation mode priority value and retains information about the additional physical power demand of the operation mode being additionally demanded by said operation mode with respect to the next higher-priority operation mode of the same electricity consuming device.

Thus, an efficient determination of a staggered scheme of the possible operation modes for all the electricity consuming devices.

In a further embodiment of the computer program according to the disclosure, the instructions include a program routine which determines a first allocation priority value for such cases of the electric machine being operated in a first operation variant as an electric vehicle propulsion motor being one of the electricity consuming devices. Furthermore, the program routine also determines a second allocation priority value for such cases of the electric machine being operated in a second operation variant as a generator being part of the electric power supply system.

By these means, both operation variants can be taken into account for optimizing the load shedding.

The computer-readable medium according to the disclosure has stored thereon the computer program.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic of a vehicle 2 being a mild Hybrid Electrical Vehicle, in particular a passenger car. The vehicle 2 comprises a combustion engine (not shown) for propulsion of the vehicle 2 according to a propulsion demand of a driver. The vehicle 2 comprises a battery 4 being a 48 Volt battery. Furthermore, the vehicle 2 comprises a DC/DC converter 6 to convert or transfer power from the 48V system to the 12V system of the vehicle 2, an electrically heated catalyst 8, an electrically driven compressor 10 and a 230 Volt power socket 12.

The DC/DC converter 6, the electrically heated catalyst 8, the electrically driven compressor 10, and the 230 V power socket 12 are electricity consuming devices of the vehicle 2. The aforementioned electricity consuming devices (6, 8, 10, 12) are connected to the same powernet (e.g., power supply system).

The vehicle 2 also comprises an electric machine, i.e. a belt-driven Integrated Starter Generator (subsequently being abbreviated as "BISG") 14.

The BISG 14 is operable in two different operation variants. In its first operation variant, the BISG 14 is operable as an electric vehicle propulsion motor. Being operated as such electric vehicle propulsion motor, it is arranged in such a way as to provide mechanical power to drive the vehicle 2. The BISG 14 in its first operation variant can contribute to mechanically driving the vehicle 2, in particular in combination with a contribution from the combustion engine or on its own, depending on the actual driving conditions of the vehicle 2. Thus, in its first operation variant, the BISG 14 may be supplied with electric power to convert said electric power into mechanical power. Therefore, the BISG 14 can work as an electricity consuming device.

In its second operation variant, the BISG 14 is operable as a generator. Being operated as such generator, it is arranged in such a way as to work to generate electric power by converting mechanical power from either the combustion engine or due to recuperation when decelerating the vehicle. In this second operation variant, the BISG 14 is arranged in such a way as to contribute to electrically supplying the power demand of the vehicle 2.

Also, the battery 4 is operable in two operation variants. In its first operation variant, the battery 4 can work as a part of an electric power supply system of the vehicle 2, being arranged in such a way as to provide electric power to supply other devices. In its second operation variant, the battery 4 is being charged, thus working as an electricity consuming device in the sense that the battery 4 does consume electric power from the BISG 14 for the charging process. In this sense, the battery 4 may comprise not only the battery cells, e.g. electrochemical cells, but also may comprise one or more control devices 18 for controlling charging of the battery cells in the second operation variant, as well as discharging in the first operation variant.

Depending on the actual operating conditions of the vehicle 2, the electric power supply system 4, 14 is able to provide a physical total available electric power.

Depending on the actual operating conditions of the vehicle 2, each of the electricity consuming devices 4, 6, 8, 10, 12, 14 has a physical electric power demand. Some electricity consuming devices do have more than only one possible operation mode, leading to different physical electric power demands being possible according to each operation mode. Each electricity consuming device 4, 6, 8, 10, 12, 14 has at least a full functionality mode, providing the entire functionality of the device but also leading to a high physical electric power demand. Some electricity consuming devices also have a reduced functionality mode with less functionality having a lower physical electric power demand. In an event that the physical total available electric power is not sufficient for supplying all functionality, at least a basic functionality can be provided in a reduced functionality mode.

The possible operation modes of the electricity consuming devices 4, 6, 8, 10, 12, 14 are shown in table 1:

TABLE 1

| index of operation mode | electricity consuming device | function-ality | power request value | power request increment value | operation mode priority value |
|---|---|---|---|---|---|
| 1 | BISG 14 in first operation variant | full | R1 | Ri1 (=R1) | 1 |
| 2 | DC/DC converter 6 | minimum | R2 | Ri2 (=R2) | 2 |
| 3 | DC/DC converter 6 | full | R3 | Ri3 (=R3-R2) | 3 |
| 4 | electrically heated catalyst 8 | minimum | R4 | Ri4 (=R4) | 4 |
| 5 | electrically heated catalyst 8 | full | R5 | Ri5 (=R5-R4) | 5 |
| 6 | electrically driven compressor 10 | minimum | R6 | Ri6 (=R6) | 6 |
| 7 | electrically driven compressor 10 | medium | R7 | Ri7 (=R7-R6) | 7 |
| 8 | electrically driven compressor 10 | full | R8 | Ri8 (=R8-R7) | 8 |
| 9 | 230 Volt power socket 12 | minimum | R9 | Ri9 (=R9) | 9 |
| 10 | 230 Volt power socket 12 | full | R10 | Ri10 (=R10-R9) | 10 |
| 11 | battery 4 in second operation variant | minimum | R11 | Ri11 (=R11) | 11 |
| 12 | battery 4 in second operation variant | full | R12 | Ri12 (=R12-R11) | 12 |

Thus, in total there are twelve possible operation modes of the electricity consuming devices 4, 6, 8, 10, 12, 14 of the vehicle 2. At full functionality of the BISG 14 in its first operation variant, the BISG 14 is used to support the combustion engine for providing propulsion. At minimum functionality of the DC/DC converter 6, the minimum viable 12 V consumers are supplied, other 12 V consumers are shed. At full functionality of the DC/DC converter 6, all 12 V consumers are powered. At minimum functionality of the electrically heated catalyst 8, the minimum amount heat is provided electrically; other means to heat aftertreatment are desired. At full functionality of the electrically heated catalyst 8, all heating demanded is provided electrically. At minimum functionality of the electrically driven compressor 10, support for steady-state operation is provided. At medium functionality of the electrically driven compressor 10, support for transient operation that is influencing exhaust gas recirculation is provided. At full functionality of the electrically driven compressor 10, support for transient operation that is not influencing exhaust gas recirculation is further provided. At minimum functionality of the 230 Volt power socket 12, charging a low-power mobile device of up to 100 Watt of physical electric power demand is supported. At full functionality of the 230 Volt power socket 12, a driver-chosen power level is supported. At minimum functionality of the battery 4, emergency charging of the battery to minimum state of charge in order to prevent damage is provided. At full functionality of the battery 4, charging the battery when state of charge is below a threshold is provided. In the case that the BISG 14 is operated as a motor for propulsion, it can temporarily not contribute to the power supply system as a generator according to its second operation variant, being unable in such case to electrically supply the other electricity consuming devices 4, 6, 8, 10, 12.

In the future, there may be more electricity consuming devices to be considered or more graduated functionality modes for some or all of the devices. For example, the BISG 14 in its first operation variant being a motor may have more than one functionality, e.g. additional operation modes with reduced functionality can be assigned for only filling transient gaps of the combustion engine torque (such as turbo hole).

The vehicle 2 comprises a power allocation device 16 being arranged to operate the physical allocation of electrical power from the electric power supply system 4, 14 to the electricity consuming devices 4, 6, 8, 10, 12, 14. The power allocation device 16 comprises control devices 18, 20, 22, 24, 26, 28 being arranged to manage electrical connections or a quantitative distribution between the electricity consuming devices 4, 6, 8, 10, 12, 14 and the electric power supply system 4, 14. Thereby each of the electricity consuming devices 4, 6, 8, 10, 12, 14 can be supplied with an individual device amount of allocated electric power from the electric power supply system 4, 14. Operation of the control devices 18, 20, 22, 24, 26, 28 can be executed by the microcontroller 30 being part of the power allocation device 16. The power allocation device 16 may be implemented in the form of a single integrated electronic control module. Thus, the components of the power allocation device 16 can also be implemented locally apart of each other with the microcontroller 30 and the control devices 18, 20, 22, 24, 26, 28 being located in different locations of the vehicle 2, the microcontroller being in communication with each one of the control devices 18, 20, 22, 24, 26, 28. For example, the control devices 18, 20, 22, 24, 26, 28 can be physically implemented as components of the electricity consuming devices 4, 6, 8, 10, 12, 14 communicating with the microcontroller 30. In this sense, the rectangle indicating the power allocation device 16 in FIG. 1 is not to be understood as a physical boundary of an integrated electronic control module but merely is to be understood as indication of the control devices 18, 20, 22, 24, 26, 28 to functionally be part of the power allocation device 16.

In one example, maintaining the minimum functionality of a device is more desired than providing its full functionality with respect to drivability and comfort purposes. Furthermore, providing the full functionality of a first device may be more prioritized than providing the full functionality of a second device, but such consideration may be inverse with respect to the minimum functionality of the same devices. If the case is met that the electric power supply system 4, 14 is not able to provide all the physical electric power which is desired for full functionality of all electricity consuming devices 4, 6, 8, 10, 12, 14, the method according to the disclosure provides load shedding in such a way that such possible operation modes being the least prioritized are shed first.

For this reason, an operation mode priority scheme can be provided and can be used to determine a certain set of the possible operation modes of the electricity consuming devices 4, 6, 8, 10, 12, 14 which can be supplied, altogether being the higher priority operation modes.

In a first step, an electric power request scheme is determined. The electric power request scheme is a data set comprising a plurality of electric power request increment values. The data set retains the information about the actual physical electric power demands of the possible operation modes of the electricity consuming devices. Each possible operation mode refers to one electric power request increment value. In this exemplary embodiment, the information about the actual physical electric power demands is comprised in such a structure that each electric power request increment value represents a difference with respect to another possible operation mode with the next lower physical electric power demand of the same electricity consuming device. As an example, the operation mode with minimum functionality of the electrically heated catalyst 8 refers to its electric power request increment value, said increment value representing the difference in physical power demand with respect to the next lower physical power, i.e. compared to the mode of being shed. The next possible operation mode of the electrically heated catalyst 8 with a higher physical electric power demand is the operation mode with full functionality. Thus the difference of its higher physical electrical power demand with respect to the physical electrical power demand of the minimum functionality mode is exactly the electric power request increment value to which the full functionality mode of the electrically heated catalyst 8 refers. Thereby, for each electricity consuming device 4, 6, 8, 10, 12, 14 its actual power request value being referred by one mode of operation can be determined by summing up the electric power request increment values referred to by the lower reduced operation modes of the device. Each actual power request value represents the physical electric power demand of the operation mode being referred to.

A set of twelve power request increment values referring to twelve possible operation modes is shown in the table 2 below.

TABLE 2

| index of operation mode | electricity consuming device | function-ality | power request value | power request increment value | operation mode priority value |
|---|---|---|---|---|---|
| 1 | BISG 14 in first operation variant | full | R1 | Ri1 (=R1) | 1 |
| 2 | DC/DC converter 6 | minimum | R2 | Ri2 (=R2) | 2 |
| 3 | DC/DC converter 6 | full | R3 | Ri3 (=R3-R2) | 3 |
| 4 | electrically heated catalyst 8 | minimum | R4 | Ri4 (=R4) | 4 |
| 5 | electrically heated catalyst 8 | full | R5 | Ri5 (=R5-R4) | 5 |
| 6 | electrically driven compressor 10 | minimum | R6 | Ri6 (=R6) | 6 |
| 7 | electrically driven compressor 10 | medium | R7 | Ri7 (=R7-R6) | 7 |
| 8 | electrically driven compressor 10 | full | R8 | Ri8 (=R8-R7) | 8 |
| 9 | 230 Volt power socket 12 | minimum | R9 | Ri9 (=R9) | 9 |
| 10 | 230 Volt power socket 12 | full | R10 | Ri10 (=R10-R9) | 10 |
| 11 | battery 4 in second operation variant | minimum | R11 | Ri11 (=R11) | 11 |
| 12 | battery 4 in second operation variant | full | R12 | Ri12 (=R12-R11) | 12 |

The table 2 shows all twelve possible operation modes of the six electricity consuming devices 4, 6, 8, 10, 12, 14 of the vehicle 2, the operation modes being numbered with an individual index each in the leftmost column. Both the set of power request values and the set of power request increment values do retain the same information when taking into account the knowledge about the above mentioned interrelation, only the notation being different. The information according to the power request scheme can be gauged e.g. by measuring and evaluation devices, e.g. voltage measuring devices, current measuring devices, and evaluation devices for determining the electric power request values and calculating the corresponding power request increment values (as pointed out in parentheses for the power request increment values in the table above). Another possibility is that the power request values or the power request increment values, respectively, are gauged from a fixed set of nominal data representing the physical data they relate to.

Furthermore, an operation mode priority scheme is evaluated according to the method. The operation mode priority scheme is a data set of a plurality of operation mode priority values. The operation mode priority scheme according to the exemplary embodiment is also shown in the table above, the operation mode priority values being listed in the rightmost column. Each of the operation mode priority values refers to exactly one of the possible operation modes of the electricity consuming devices 4, 6, 8, 10, 12, 14. Usually, each of the operation mode priority values is different from all other operation mode priority values, allowing for a definite order of the operation mode priority values and thus also for a corresponding order of importance of the referred possible operation modes.

Usually, the operation mode priority scheme is predetermined as an individual choice due to consideration of safety, comfort and performance attributes during use of the vehicle 2. For example, the operation mode priority scheme can be predetermined by the manufacturer of the vehicle 2. The operation mode priority values might also be changeable, either by service means of the vehicle 2 or to a certain extent even by a driver of the vehicle 2.

The table 3 shows three examples of calibrations of the operation mode priority scheme, each of said scheme being the set of operation mode priority values in one of the three rightmost columns:

TABLE 3

| index of operation mode | electricity consuming device | functionality | operation mode priority value for passenger vehicle | operation mode priority value for sporty vehicle | operation mode priority value for commercial vehicle |
|---|---|---|---|---|---|
| 1 | BISG 14 in first operation variant | full | 11 | 10 | 12 |
| 2 | DC/DC converter 6 | minimum | 3 | 3 | 3 |
| 3 | DC/DC converter 6 | full | 9 | 9 | 9 |
| 4 | electrically heated catalyst 8 | minimum | 4 | 4 | 4 |
| 5 | electrically heated catalyst 8 | full | 7 | 11 | 7 |
| 6 | electrically driven compressor 10 | minimum | 5 | 5 | 5 |
| 7 | electrically driven compressor 10 | medium | 8 | 7 | 10 |
| 8 | electrically driven compressor 10 | full | 10 | 8 | 11 |
| 9 | 230 Volt power socket 12 | minimum | 2 | 2 | 2 |
| 10 | 230 Volt power socket 12 | full | 12 | 12 | 8 |
| 11 | battery 4 in second operation variant | minimum | 1 | 1 | 1 |
| 12 | battery 4 in second operation variant | full | 6 | 6 | 6 |

Each of the three right-most columns refers to a different type of vehicle. The first entries of operation mode priority values may be the same for the different vehicles. For example, the highest priority value (being the lowest scalar of "1") according to the typical convention refers to the minimum functionality of the operation mode with index 11, thus referring to the minimum functionality of the battery. The battery in this case is primarily supplied with electricity to maintain a minimum state of charge to avoid degradation and maintain desired operation of the vehicle. Furthermore, the second highest priority value (being the scalar of "2") according to the typical convention refers to the minimum functionality of the operation mode with index 9, e.g. providing electric supply for charging a device on the 230 Volt power socket that would allow for calling help. The functionality of maintaining the desired part of the 12 Volt board net active has the third highest priority value (being "3"). For lower priorities, the exemplary operation mode priority values differ. The lowest operation mode priority value (being "12") refers to the 230 Volt power socket in its full functionality mode for the passenger vehicle and the sporty vehicle. However, for the commercial vehicle the 230 Volt power socket in its full functionality mode is considered to be more prioritized, represented by the higher operation mode priority value (being "8").

Each of the schemes discussed above can be handled as a vector. For example, the electric power request scheme can be handled as an electric power request vector having the plurality of power request values and/or power request increment values as its entries. The calibrated operation mode priority scheme can be handled as an operation mode priority vector having the plurality of operation mode priority values as its entries. Operations of determining and/or evaluating the schemes can easily be performed via a computer program according to the disclosure.

In a further method step, a certain allocation priority value is determined. The allocation priority value allows for automatically controlling the power allocation device in such a way as to allow for allocation of a certain device amount of power to some or all of the electricity consuming devices 4, 6, 8, 10, 12, 14.

The allocation priority value is determined as the lowest among all the operation mode priority values which does meet the condition that the total available electric power value is equal or by an excess available power value higher than the sum of power request increment values being referred to by the operation mode priority values which are smaller than the allocation priority value.

Alternatively, in terms of the power request values (instead of the power request increment values), the allocation priority value can be determined as the lowest among all the operation mode priority values which does meet the condition that the total available electric power value is equal or by an excess available power value higher than the sum of the maximum power request values of each of the electricity consuming devices being referred to by one of the operation mode priority values which are equal or smaller than the allocation priority value.

The total available electric power value according to this method step retains the information of the physical total available electric power. The determination of the total available electric power value can be executed e.g. by measuring and evaluation devices of the vehicle 2 being associated with and/or being part of the electric power supply system 4, 14, e.g. voltage measuring devices, current measuring devices, temperature measuring devices, and evaluation devices for determining the total available electric power value from data being gauged thereby. Alternatively, the total available electric power value can be determined by evaluating older empirical values of total available electric power values or information related thereto. In each case, the determined total available electric power value thus retains the information of the physical total available electric power.

Having determined the allocation priority value, the physical allocation of electric power from the power supply system 4, 14 to the electricity consuming devices 4, 6, 8, 10, 12, 14 can be carried out.

For this reason, the physical allocation of electric power from the electric power supply system 4, 14 to the electricity consuming devices 4, 6, 8, 10, 12, 14 is operated by the power allocating device 16.

The power allocating device 16 is operated in such a way that an individual device amount of allocated electric power is physically allocated from the electric power supply system 4, 14 to each of the electricity consuming devices 4, 6, 8, 10, 12, 14 having an operation mode priority value being smaller or equal than the allocation priority value.

The individual device amount of allocated power for these devices corresponds to the maximum power request value of each of the electricity consuming devices being referred to by one of the operation mode priority values being equal or smaller than the allocation priority value.

In terms of power request increment values (instead of maximum power request values), the individual device amount of allocated power for these devices corresponds to the sum of the set of power request increment values referring to all the operation mode priority values being equal or smaller than the allocation priority value. A vector of indices associates the power request increment values with a given device.

An embodiment of the method can be performed in that a first electric power request scheme is determined, its data set comprising a power request value and/or power request increment value retaining the information about the physical electric power demand of the electric machine 14 in its first operation variant, and in that a first total available electric power value retaining the information of the physical total available electric power of the electric power supply system 4 neglecting eventual power contributions of the electric machine in its second operation variant is determined.

A further embodiment of the method can be performed in that a second electric power request scheme is determined, its data set comprising a power request value and/or power request increment value retaining the information about no physical electric power demand of the electric machine 14 in its second operation variant, and in that a second total available electric power value retaining the information of the physical total available electric power of the electric power supply system 4, 14 including an electrical power contribution from the electric machine 14 in its second operation variant is determined.

The method steps as mentioned above are usually performed permanently, e.g. in one or more loops being sequentially repeated.

A computer program comprises instructions to cause the vehicle to execute the steps of the method as discussed above. Some method steps which are caused by the computer program to be performed by the vehicle are visualized as a flow chart in FIG. 2. In one example, instructions for carrying out method 200 and the rest of the methods included herein may be executed by a controller (e.g., microcontroller) based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 200 begins at 202, which includes where a few variables are initialized that store the cumulated power requests with and without propulsion and the index to the last power request that still can be supported.

At 204, the method 200 increments the running variable i and adds the power with priority i to the cumulated powers.

At 206, the method 200 compares the cumulated power including propulsion with the available power from the battery 4. If it exceeds the cumulated power, then the preceding power request is the last one that can fully be supported, and this index is stored at 208.

At 210, the method 200 includes comparing the cumulated power without propulsion requests with the available power from both the battery 4 and the BISG 14. If it exceeds this cumulated power, then again the index of the last fully supported power request is stored in at 212.

At 214, the method 200 includes determining if either i has reached the end of the list of power requests or the index has been set at 208, the procedure is terminated (end J). Otherwise the method 200 returns to 204.

Now two allocation priority values have been determined in the list of power requests. The available power may be allocated to the devices. After the execution of the listing of the instructions of the computer program, the allocated power for each of the electricity consuming devices 4, 6, 8, 10, 12, 14 is determined and operation of the power allocating device 16 according thereto can be carried out.

When propulsion is supported, no partial allocation of the next power request is performed. Instead, the unallocated power is kept in order to sustain the propulsion for a longer period of time since only the battery 4 is providing the power. In the case that no propulsion is supported, the remaining power is allocated as a partial fulfillment to the next power request in the priority list since now the BISG 14 is available as a sustainable power resource.

These exemplary instructions of a computer program can perform some steps according to the method but are to be understood as not being limiting.

Turning now to FIG. 3, it shows a method 300 for generating two power allocation indices for operating one or more electric consumers in various modes based on a prioritization thereof. The prioritization of the electric consumers may be proportional to a usage of the consumer directly to driving related tasks and/or to mitigation of degradation thereof. For example, maintaining a battery state-of-charge (SOC) above a lower value may be a highest priority. Example prioritizations are shown in table 3 above.

The method 300 may begin at 302, which includes receiving power requests. One or more electric consumers may request an amount of power to operate. A controller may receive the requests and track the requests prior to determining a power allocation strategy.

At 304, the method 300 may include assigning priority values to each of the power requests. As described above, the priority values may be assigned to each electric consumer. For example, if there are 12 electric consumers, a value of 1 may correspond to a highest priority and a value of 12 may correspond to a lowest priority. Thus, the consumer assigned a priority value of 1 may receive more power than the consumer assigned a priority value of 12 during conditions where available power is less than a total of the power demanded to meet the power requests. Priority values assigned to the consumers may be dynamic and adjusted based on different applications. For example, if a vehicle is being driven in a sporty mode, propulsion power may be prioritized over a power-to-the-box (PttB). As another example, if the vehicle is being driven in a commercial mode, PttB may be prioritized over transient operation of an e-compressor. Additionally or alternatively, priority values may be adjusted based on one or more of a vehicle make, a model, a driver behavior, a driver sex, a driver age, a vehicle location, weather, a fuel level, a vehicle traction, and/or a vehicle maintenance history.

In one example, higher priority consumers (e.g., priority values between 1-6) may be constant through a range of operating parameters. Priority values may change for lower priority consumers (e.g., priority values between 7-12) based on current vehicle operating parameters. For example, the priority of the PttB may increase when the vehicle is parked relative to when the vehicle is being driven.

At 306, the method 300 may include determining a battery power limit. The battery power limit may be based on a total available electric power value. The total available electric power value may be determined via measuring and evaluation devices of the vehicle being associated with and/or being part of the electric power supply system, e.g. voltage measuring devices, current measuring devices, and evaluation devices for determining the total available electric power value from the measured data. Alternatively, the total available electric power value can be obtained by evaluating empirical values of total available electric power values or information related thereto. In each case, the determined total available electric power value thus retains the information of the physical total available electric power.

At 308, the method 300 may include determining the power provided by the BISG as a generator and exclude power provided as torque. In one example, the power provided as torque from the BISG may be based on a difference between total vehicle torque and engine torque. In one example, the BISG may be configured to operate as only a motor or a generator. As such, if the BISG is providing torque, then the power provided therefrom may be zero.

At 310, the method 300 may include determining the combined available power from the battery and the BISG. As such, both power availabilities are determined and used for planning allocation of electric power distribution.

At 312, the method 300 may include generating an index of operating modes of the electric consumers based on available power with the battery and BISG. The index may include determining a power allocation based on the available power and power requests. The index including the power allocation may initially meet power requests of the higher priority consumers before meeting demands of the lower priority consumers. In one example, the power allocation may include meeting at least a lowest operation (e.g., minimum shown in Tables 2 and 3) of each of the consumers before increasing power provided to one or more consumers above the lowest operation. Thus, once the lowest operation of each consumer is met, the indexing may then increase the power provided to one or more consumers to a next higher level of operation or a maximum operation based on consumer priority. In some example, if each consumer includes three operations, the lowest operation, a mid-operation, and a highest operation, once the lowest operation of each consumer is met, the indexing may increase allocation of power to higher priority consumers to the mid-operation or the highest operation while maintaining power allocation to other lower priority consumers at the lowest operation.

At 314, the method 300 may include generating an index of operating modes of the electric consumers based on available power from only the battery. The index of operating modes with only the battery may be similar to the index with the battery and BISG, except that there is less power to allocate to each of the consumers. As such, a lower number of consumers may be allocated power to operate in the mid-operation or the highest operation.

At 316, the method 300 may include allocating electric power based on the selected index. The index selection may be based on operation of the BISG. If the BISG is providing torque, then the index with only power available from the battery is selected. If the BISG is not providing torque, then the index with power available from the battery and the BISG.

At 318, the method 300 may include continuing to update the indices based on available power. For example, as the battery SOC changes, as the battery temperature changes, and as operation of the BISG changes. By doing this, two separate indices may be maintained based on battery and BISG operation and conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a plurality of electric consumers comprising one or more operating modes with different levels of power consumption;

an energy storage device arranged in a vehicle;
an electric machine arranged in the vehicle and configured to provide power to the energy storage device or power to the electric consumers and torque to wheels of the vehicle;
a power allocating device coupled to the energy storage device and the plurality of electric consumers; and
a controller comprising computer-readable instructions stored on memory thereof that when executed enable the controller to:
maintain two indices for allocating power to the plurality of electric consumers, wherein a first index comprises a first power allocation strategy based on power from only the energy storage device and a second index comprises a second power allocation strategy based on power from the energy storage device and the electric machine.

2. The system of claim 1, wherein the electric machine is operable in a first operation as an electric vehicle propulsion motor and a second operation as a generator.

3. The system of claim 2, wherein the instructions further enable the controller to select the first index in response to the electric machine operating in the first operation.

4. The system of claim 2, wherein the instructions further enable the controller to select the second index in response to the electric machine operating in the second operation.

5. The system of claim 1, wherein the instructions further enable the controller to update the two indices based on one or more of a power limit of the energy storage device, a state-of-charge of the energy storage device, a temperature of the energy storage device, and an operation of the electric machine.

6. The system of claim 1, wherein the two indices each comprise a prioritization for each of the plurality of electric consumers.

7. The system of claim 6, wherein the instructions further enable the controller to allocate power to the plurality of electric consumers based on the prioritization.

8. The system of claim 1, wherein the plurality of electric consumers each includes a minimum power operation and a maximum power operation.

9. A method, comprising:
generating a first index prioritizing a plurality of consumers and strategizing power allocation to the plurality of consumers via only a battery; and
generating a second index prioritizing the plurality of consumers and strategizing power allocation to the plurality of consumers via the battery and an electric motor operating as a generator.

10. The method of claim 9, further comprising selecting the first index in response to the electric motor operating as an electric vehicle propulsion motor, and selecting the second index in response to the electric motor operating as the generator.

11. The method of claim 9, further comprising updating the first index and the second index in response to one or more of a power limit of the battery changing, a state-of-charge (SOC) of the battery changing, a temperature of the battery changing, and operation of the electric motor.

12. The method of claim 9, wherein each of the plurality of consumers comprises multiple operating modes including a minimum operation, a mid-operation, and a maximum operation.

13. The method of claim 12, wherein the minimum operation consumes less power than the mid-operation, and wherein the mid-operation consumes less power than the maximum operation.

14. The method of claim 13, further comprising operating each of the plurality of consumers at at least the minimum operation following selecting the first index or the second index.

15. The method of claim 14, further comprising operating higher priority consumers of the plurality of consumers at the mid-operation or the maximum operation in response to more power being available after operating lower priority consumers at the minimum operation.

16. A method for a vehicle comprising an energy storage device, an electric machine configured to provide power to the energy storage device or power to a plurality of electric consumers and torque to wheels of the vehicle, and a power allocating device coupled to the energy storage device and the plurality of electric consumers, the method comprising:
generating a first index prioritizing the plurality of electric consumers and strategizing power allocation to the plurality of electric consumers via only a battery; and
generating a second index prioritizing the plurality of electric consumers and strategizing power allocation to the plurality of electric consumers via the battery and an electric motor operating as a generator; wherein
each of the plurality of electric consumers comprises multiple operating modes including a minimum operation, a mid-operation, and a maximum operation.

17. The method of claim 16, wherein the minimum operation consumes less power than the mid-operation, and wherein the mid-operation consumes less power than the maximum operation, and further comprising operating each of the plurality of electric consumers at at least the minimum operation following selecting the first index or the second index.

18. The method of claim 17, further comprising operating higher priority consumers of the plurality of electric consumers at the mid-operation or the maximum operation in response to more power being available after operating lower priority consumers at the minimum operation.

19. The method of claim 16, wherein the vehicle is a hybrid vehicle.

20. The method of claim 16, further comprising decreasing power provided to lower priority consumers of the plurality of electric consumers in response to a power limit of the battery decreasing.

* * * * *